(12) United States Patent
Lamy et al.

(10) Patent No.: US 9,767,599 B2
(45) Date of Patent: Sep. 19, 2017

(54) SURFACE APPEARANCE SIMULATION

(75) Inventors: Francis Lamy, Wollerau (CH); Jon Kenneth Nisper, Grand Rapids, MI (US)

(73) Assignee: X-Rite Inc., Grand Rapids, MI (US)

( * ) Notice: Subject to any disclaimer, the term of this patent is extended or adjusted under 35 U.S.C. 154(b) by 715 days.

(21) Appl. No.: 11/617,880

(22) Filed: Dec. 29, 2006

(65) Prior Publication Data
US 2008/0158239 A1 Jul. 3, 2008

(51) Int. Cl.
| | |
|---|---|
| G06F 17/00 | (2006.01) |
| G06T 15/50 | (2011.01) |
| G06F 3/01 | (2006.01) |
| G06T 15/04 | (2011.01) |
| G09G 3/00 | (2006.01) |
| G09G 5/00 | (2006.01) |

(52) U.S. Cl.
CPC .............. G06T 15/50 (2013.01); G06F 3/016 (2013.01); G06T 15/04 (2013.01); G09G 3/001 (2013.01); G09G 5/00 (2013.01); G09G 2360/144 (2013.01)

(58) Field of Classification Search
CPC ......... G06T 15/50; G06T 15/04; G06F 3/016; G09G 3/001; G09G 5/00; G09G 2360/144
USPC .................................................. 345/418–618
See application file for complete search history.

(56) References Cited

U.S. PATENT DOCUMENTS

| | | | |
|---|---|---|---|
| 5,710,876 A | 1/1998 | Peercy et al. | |
| 5,774,357 A | 6/1998 | Hoffberg et al. | |
| 5,805,782 A | 9/1998 | Foran | |
| 5,903,454 A | 5/1999 | Hoffberg et al. | |
| 5,912,739 A | 6/1999 | Fowler et al. | |
| 6,023,523 A | 2/2000 | Cohen | |
| 6,141,725 A * | 10/2000 | Tucker et al. | ................ 711/100 |
| 6,184,847 B1 | 2/2001 | Fateh et al. | |
| 6,222,937 B1 * | 4/2001 | Cohen et al. | ................ 382/154 |
| 6,268,857 B1 | 7/2001 | Fishkin et al. | |
| 6,349,300 B1 | 2/2002 | Graf et al. | |
| 6,359,603 B1 | 3/2002 | Zwern | |
| 6,411,275 B1 | 6/2002 | Hedberg | |
| 6,445,364 B2 | 9/2002 | Zwern | |
| 6,486,879 B1 * | 11/2002 | Nagano et al. | ................ 345/420 |
| 6,639,594 B2 | 10/2003 | Zhang et al. | |

(Continued)

FOREIGN PATENT DOCUMENTS

| | | |
|---|---|---|
| EP | 1202222 | 5/2002 |
| WO | WO 2004/018984 A1 | 3/2004 |

OTHER PUBLICATIONS

Ikei et al., Texture Presentation by Vibratory Tactile Display, Proceedings of the IEEE 1997 Virtual Albuqurque, Mar. 1-5, 1997 and Proceedings of the IEEE Virtual Realtiy Alamitos, IEEE Comp. Soc. Press, US, Mar. 1, 1997, pp. 199-205.

(Continued)

Primary Examiner — Abderrahim Merouan
(74) Attorney, Agent, or Firm — Hahn Loeser & Parks LLP

(57) ABSTRACT

A processor-based device for displaying simulated or modeled surface appearances based on surface color and surface texture data stored in a data storage. By selecting different combinations of color and texture, different surface appearances may be modeled and displayed. Also, the device may comprise an orientation sensor. Accordingly, the device may additionally consider the orientation of the device when generating surface appearances.

31 Claims, 17 Drawing Sheets

(56) References Cited

U.S. PATENT DOCUMENTS

| | | | |
|---|---|---|---|
| 6,741,655 B1 * | 5/2004 | Chang et al. | 375/240.26 |
| 6,765,573 B2 * | 7/2004 | Kouadio | 345/426 |
| 6,903,738 B2 * | 6/2005 | Pfister et al. | 345/420 |
| 6,906,643 B2 | 6/2005 | Samadani | |
| 6,928,454 B2 | 8/2005 | Menner et al. | |
| 6,937,272 B1 | 8/2005 | Dance | |
| 6,977,675 B2 * | 12/2005 | Kotzin | 348/208.2 |
| 7,079,137 B2 * | 7/2006 | Borshukov | 345/426 |
| 7,109,967 B2 | 9/2006 | Hioki et al. | |
| 7,200,262 B2 * | 4/2007 | Sawada | 382/154 |
| 7,250,998 B2 * | 7/2007 | Narutaki et al. | 349/114 |
| 7,456,823 B2 * | 11/2008 | Poupyrev | G06F 3/011 178/18.06 |
| 7,565,005 B2 * | 7/2009 | Sawada | 382/154 |
| 2002/0126117 A1 | 9/2002 | Grzeszczuk | |
| 2002/0184232 A1 * | 12/2002 | Menner et al. | 707/104.1 |
| 2003/0011596 A1 | 1/2003 | Zhang | |
| 2003/0030639 A1 * | 2/2003 | Ritter | 345/426 |
| 2003/0038822 A1 * | 2/2003 | Raskar | 345/632 |
| 2003/0195901 A1 * | 10/2003 | Shin et al. | 707/104.1 |
| 2003/0198008 A1 * | 10/2003 | Leapman et al. | 361/681 |
| 2003/0234797 A1 * | 12/2003 | Williams et al. | 345/649 |
| 2004/0001059 A1 * | 1/2004 | Pfister et al. | 345/419 |
| 2004/0008191 A1 * | 1/2004 | Poupyrev et al. | 345/184 |
| 2004/0070565 A1 * | 4/2004 | Nayar et al. | 345/156 |
| 2004/0078299 A1 | 4/2004 | Down-Logan et al. | |
| 2004/0150643 A1 | 8/2004 | Borshukov | |
| 2004/0204859 A1 * | 10/2004 | Knobloch | 702/16 |
| 2005/0083293 A1 * | 4/2005 | Dixon | 345/102 |
| 2005/0090919 A1 * | 4/2005 | Pogue | G05B 19/4093 700/97 |
| 2005/0280648 A1 * | 12/2005 | Wang et al. | 345/420 |
| 2006/0106146 A1 * | 5/2006 | Xia | C08K 3/28 524/413 |
| 2006/0158881 A1 * | 7/2006 | Dowling | 362/231 |
| 2006/0210153 A1 * | 9/2006 | Sara | G01J 3/46 382/165 |
| 2006/0238502 A1 * | 10/2006 | Kanamori et al. | 345/156 |
| 2006/0262140 A1 * | 11/2006 | Kujawa et al. | 345/633 |
| 2006/0279732 A1 | 12/2006 | Wang et al. | |
| 2007/0004513 A1 * | 1/2007 | Wells et al. | 463/31 |
| 2007/0061101 A1 * | 3/2007 | Greene et al. | 702/152 |
| 2007/0153357 A1 * | 7/2007 | Noh et al. | 359/267 |
| 2007/0222922 A1 * | 9/2007 | Jin et al. | 349/110 |
| 2007/0238957 A1 * | 10/2007 | Yared | 600/407 |
| 2007/0247422 A1 * | 10/2007 | Vertegaal et al. | 345/156 |
| 2007/0276590 A1 * | 11/2007 | Leonard et al. | 701/207 |
| 2011/0301453 A1 * | 12/2011 | Ntziachristos et al. | 600/425 |

OTHER PUBLICATIONS

Dana, et al., Textured Surface Modeling, IEEE Workshop on the Integration of Appearance and Geometric Modelling, 1999, pp. 199-2005.

PCT International Search Report dated Oct. 23, 2008.

Andy Lindsay, "Accelerometer—Tilt, Graphics and Video Games," last revised on Apr. 24, 2005, printed from www.parallax.com/dl/docs/prod/compshop/TiltDispCntrl.pdf on Dec. 21, 2006.

William Yerazunis et al., "Active Display Stabilization," White Paper, Mitsubishi Electronics Research Laboratories, last revised on Jul. 18, 2001, printed from www.merl.com/projects/shaky-display on Dec. 21, 2006.

Sergey Ershov et al., "Rendering Peralescent Appearance Based on Paint-Composition Modelling," Eurographics 2001, vol. 20, No. 3 (2001).

James Elmer Harvey, "Light Scattering Characteristics of Optical Surfaces," The University of Arizona, Ph.D. Thesis, 1976.

* cited by examiner

SURFACE APPEARANCE SIMULATION

BACKGROUND

Many industries deal with the application of color to manufactured products and other objects. In these industries, it is often a difficult challenge to effectively define and communicate object color. For example, in the automotive finish industry, it is difficult to match and verify the finish of a car for purposes of quality control in manufacturing, auto body repair, identifying and matching replacement parts, and other similar activities. In the commercial printing industry, it is difficult to define a color and predict how the color will appear when applied to objects having different surface properties (e.g., different paper types). Many other industries experience similar problems including, for example, the commercial paint industry, the architectural paint industry, the clothing/textile industry, etc.

These challenges are addressed to some extent using comparison samples. Each comparison sample has a single color applied to a single surface type. A user verifies or matches a color applied to an unknown surface by manually comparing the unknown surface to different comparison samples and finding the best match. For example, before painting a room, a homeowner may take a number of paint chips from a hardware store and manually select the chip that best matches the other features of the room. In another example, before refinishing a car, an auto body shop may compare the car's original finish to a number of finished plates and select a new finish by determining which plate best matches the original. Often, the process of comparing involves viewing the comparison samples in a number of different orientations and ambient lighting situations.

Although comparison samples can be effective in the hands of a skilled user, they also have certain drawbacks. First, it is costly to produce, distribute and store comparison samples. For example, auto body shops, hardware stores, etc., expend considerable resources purchasing and stocking comparison plates for all surface types. In addition, the number of colors for comparison is strictly limited by the number of available comparison samples. Accordingly, to obtain the best comparison possible, there is no way to avoid acquiring and stocking a large number of samples.

SUMMARY

According to one general aspect, the present invention is directed to a processor-based device for displaying simulated or modeled surface appearances based on surface color and surface texture data stored in a data storage. By selecting different combinations of color and texture, different surface appearances may be modeled and displayed. Also, the device may comprise an orientation sensor. Accordingly, the device may additionally consider the orientation of the device when generating surface appearances.

According to another general aspect, the processor may be configured to generate a plurality of Bidirectional Reflectance Distribution Functions (BRDF's) considering surface type parameters stored at data storage. Each of the BRDF's may correspond to a point positioned on a surface. The processor may solve the plurality of BRDF's for a given set of environmental conditions and also map the results to a display.

According to various embodiments, the processor may communicate with a surface measurement device that measures at least one property of a surface. The processor may also be configured to generate the simulated surface appearance based on the property of the surface and environmental factors. The surface measurement device may be in wired or wireless communication with the device, and/or may be integrated with the device, for example, in a common enclosure.

FIGURES

Various embodiments of the present invention are described herein by way of example in conjunction with the following figures wherein.

DESCRIPTION

Various embodiments of the present invention are directed to a device for computing and displaying simulated or modeled surface appearances and methods of operating and using the device. The device may have the capability to display a modeled surface appearance as it would be perceived under different environmental conditions (e.g., different viewing angles, different ambient lighting conditions, etc.). The device may compute the modeled surface appearances considering data stored in the device that allows it to display multiple surface types. The device may have a number of uses. For example, the devices may be used as a replacement for and improvement over traditional comparison samples, such as paint samples, carpet samples, etc. When a surface appearance is displayed by the device, a user may compare the device display to other surfaces/objects just as they would with a comparison sample.

The surface type to be displayed and the environmental conditions under which it is modeled may be specified, for example, by the user. Also, some embodiments of the device may include sensors for sensing environmental conditions, such as viewing angle, ambient lighting, etc. This may allow the device to display surface appearances based on the actual ambient conditions surrounding the device, causing the device to behave more like a traditional comparison sample.

Also, devices according to the present disclosure may be integrated or used in conjunction with surface measuring instruments, such as spectrophotometers, colorimeters, etc. For example, a user may use the surface measuring instrument(s) to measure a known surface, and later use the device of the present invention to recreate the surface under any desired environmental conditions.

Figure 1:
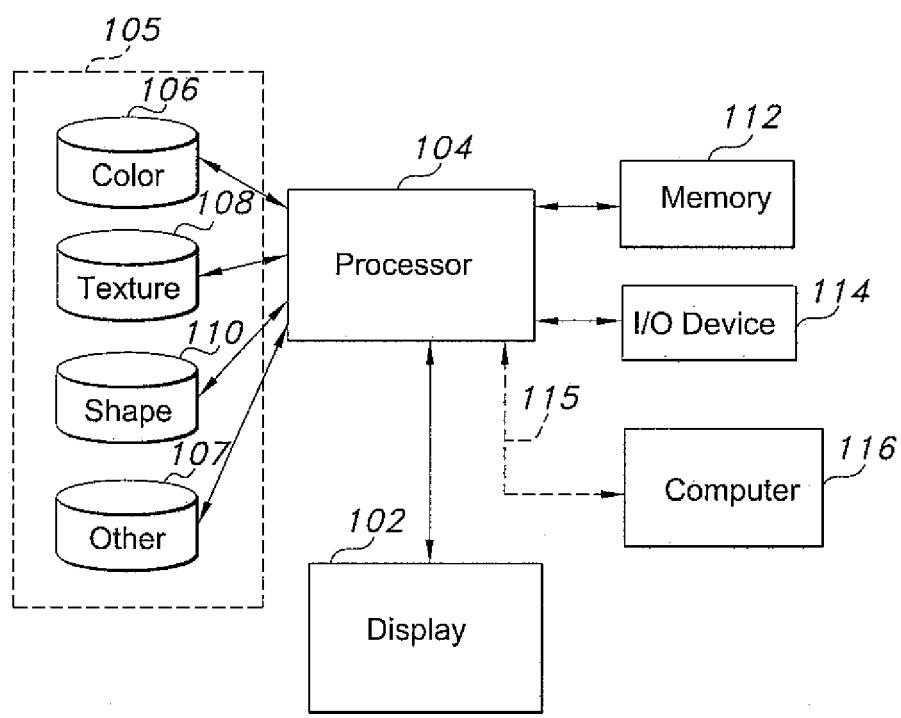
FIG. 1 illustrates a block diagram of a device according to various embodiments of the present invention.

FIG. 1 shows a block diagrams according to various embodiments, of a device 100. The device 100 may include a display 102, a processor 104, and one or more databases 106, 107, 108, 110 implemented in a data storage 105 of the device 100. The databases 106, 108, 110 may store information relating to surface features, such as color, texture and shape. According to various embodiments, the processor 104 of the device 100 may combine desired surface features, as described below, to model and display one or more surface appearances on the display 102.

The display 302 preferably has a resolution high enough to render desired surfaces and surface appearances. Preferably, the display 102 has a resolution of 72 dots per inch (dpi) or greater. For example, displays with resolutions of 300 dpi, 600 dpi, 1200 dpi, 2400 dpi, or higher may also be used. Preferably, the display 102 may also be chosen with a suitably wide color gamut, such as that of standard Red Green Blue (sRGB) or greater. In various embodiments, the display 102 may be chosen with a color gamut similar to the gamut perceptible by human sight.

The display 102 may be constructed according to any emissive or reflective display technology with a suitable resolution and color gamut. For example, the display 102 may be constructed according to liquid crystal display (LCD) technology. The LCD may be backlight by any suitable illumination source. The color gamut of an LCD display, however, may be widened or otherwise improved by selecting a light emitting diode (LED) backlight or backlights. In another example, the display 102 may be constructed according to emissive polymeric or organic light emitting diode (OLED) technology. According to various embodiments, the display 102 may be constructed according to a reflective display technology, such as electronic paper or ink. A reflective display may have the added advantage of being viewed predominantly using ambient light, which may simplify the consideration of environmental factors. Known makers of electronic ink/paper displays include E INK and XEROX.

Preferably, the display 102 also has a suitably wide field of view that allows it to generate an image that does not wash out or change severely as the user views the display 102 from different angles. Because LCD displays operate by polarizing light, some models exhibit a high degree of viewing angle dependence. Various LCD constructions, however, have comparatively wider fields of view and may be preferable for that reason. For example, LCD displays constructed according to thin film transistor (TFT) technology may have a suitably wide field of view. Also, displays 102 constructed according to electronic paper/ink and OLED technologies may have fields of view wider than many LCD displays, and may be selected for this reason. Some degree of viewing angle dependence may be tolerated in the display 102, according to various embodiments, however, depending on desired performance.

The processor 104 may be any suitable kind of processor. According to various embodiments, the processor 104 may comprise a graphics processing unit (GPU) specifically designed to handle graphics processing. For example, suitable GPU's are available from NVIDIA and ATI GRAPHICS. The processor 104 may also be in communication with memory 112 and suitable input/output devices 114. The input/output devices 114 may allow a user to configure the device 100 and/or select parameters of the surface appearance to be displayed (e.g., surface type, environmental conditions such as ambient light parameters, surface orientation parameters, etc.). In various embodiments, the device 100 may provide a menu-driven user interface on the display 102 or on a secondary display (not shown) allowing the user to enter this information. In addition to other peripherals, the processor 104 may be in communication with a computer 116 via wired or wireless data link 115, such as, for example, a RS232 or Universal Serial Bus (USB) link.

The databases 106, 108, 110 may store color, texture and shape information describing surfaces which may be rendered by the device. The color database 106 may include color information describing surfaces. The color information may be described, for example, as tristimulus values (e.g., RGB), which may describe color in terms of human perception. The color information may also be described, for example, as a spectral curve describing the scatter off of the surface over a plurality of wavelengths. The colors stored in the database 106 may include those of one or more color libraries (e.g., MLTNSELL, PANTONE, NCS, etc.). The texture database 108 may include information regarding surface textures and/or patterns to be modeled including wood finishes, carpets, wallpapers, fabrics, paints, automotive finishes, different paper types, etc. Texture information stored at database 108 may include, for example, indications of surface roughness, indications of the spatial frequency of surface features, images of example surface textures, etc. The shape database 110 may include information regarding various shapes that a surface may be modeled on including, for example, the shape of a car fender, geometric shapes, etc. For example, shape information may define a shape in terms of facets or sides, or in terms of its vertices. Other surface information (e.g., additional patterns, dielectric constants and/or other material properties, etc.) may be stored in one or more other databases, such as other database 107. In various embodiments, the color, texture and shape information stored at the databases 106, 108, 110 may be tailored to a particular industry in which the device will be used. For example, a device 100 to be used in the automotive industry may store the colors and textures of auto finishes, the shapes of auto body pieces, etc. Information stored at the databases 106, 108, 110 may be uploaded to and/or downloaded from the device 100 from the computer 116.

Figure 2:
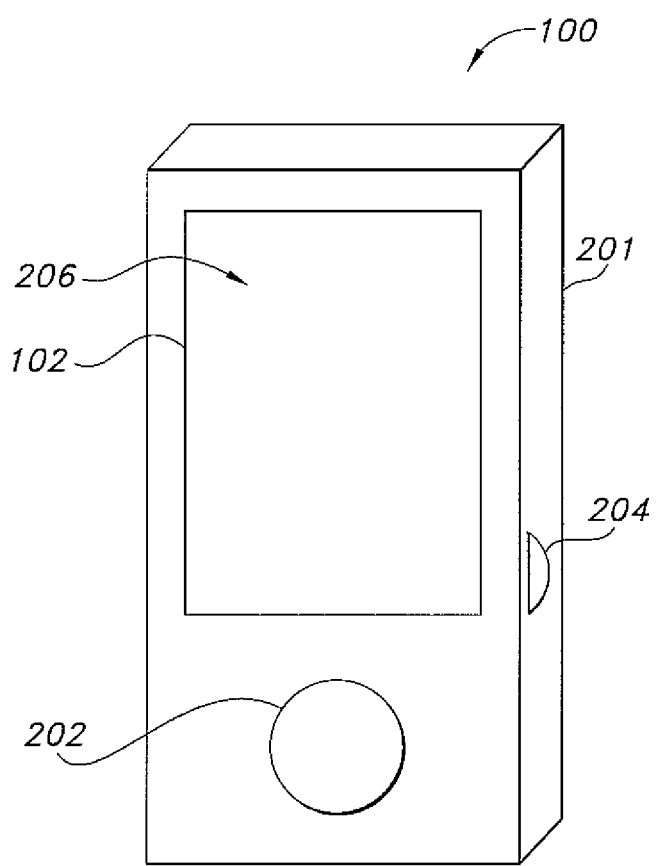
FIG. 2 illustrates a diagram of a handheld device according to various embodiments of the present invention.

FIG. 2 shows an example embodiment of the device 100 implemented as a handheld device. The processor 104, data storage 105 and other internal components of the device 100 may be included in a housing or enclosure 201. The display 102 may be mounted in the enclosure 201 as shown. FIG. 2 also shows example input/output devices including a directional switch 202 and a thumb wheel switch 204. In various embodiments, a touch sensitive overlay 206 may be placed over the display 102 to provide another user input device.

Referring again to FIG. 1, the device 100 may also be able to utilize a display of a different unit. For example, the device 100 may be configured to display a surface on a monitor of the computer 116 in addition to or instead of displaying the surface on the display 102. The device 100 may cause the computer monitor to display a modeled appearance of the surface in real time, or may send it to the computer 116 in the form of an e-mail or other message type. When the device 100 is displaying a surface appearance on an unknown monitor, it may first interrogate the monitor to determine its type and adjust the appearance of the displayed surface for optimum viewing on the monitor (e.g., based on the monitor's resolution, field of view, etc.). Also, some devices that display surface appearances on the computer 116 may omit the display 102.

Before displaying a surface, the device 100 may either generate a model of surface appearance, or receive data from a pre-generated model. Models of surface appearance may be based on properties of the surface to be rendered (e.g., color characteristics, surface features/texture, etc,) as well as the environmental conditions under which the surface is to be viewed (e.g., ambient lighting conditions, viewing angles, etc.). The contributions of each of these factors to surface appearance can be modeled for any given point on the surface with a Bi-Directional Reflectance Distribution Function (BRDF) of the surface point. The BRDF may be expressed as:

$$BRDF=BRDF(\lambda,G(f,r)) \qquad (1)$$

Lambda ($\lambda$) is the wavelength of illumination considered. The vector f represents the properties of ambient illumination (e.g., Lux level, spectral content, directional properties, etc.). The vector r represents the position vector of the surface at the surface point relative to the user's vantage point. The function G represents the relationship between f and r. The relationship between $\lambda$, f, r and C (e.g., the BRDF function) may depend on the properties of the surface. To generate a surface appearance, the BRDF may be solved for each point on the surface and for each desired wavelength given values of f and r.

It will be appreciated that, according to various embodiments, the BRDF may be expressed at differing levels of complexity. For example, the relationships between G, f, r, and $\lambda$ may be expressed at different levels of mathematical detail. According to various embodiments, G(f,r) may be represented as shown below in Equation (2):

$$G(f,r)=(1/A_0)|\int_{A0}dr e^{i2\pi fr}P(r)|^2 \qquad (2)$$

where P(r) represents the way that illumination will be scattered by the surface, and may be expressed as:

$$P(r)=P_{sys}(r) \cdot P_{sam}(r) \qquad (3)$$

Referring to Equation (3), $P_{sys}$ may represent a pupil function of the measuring system and $P_{sam}$ nay represent a contribution of the sample. Also, the BRDF may be expressed to consider factors in addition to $\lambda$, f, r and G. For example, Equation (4) below considers a polarization factor, $\Phi_{ba}$ and a factor due to Fresnel reflection, $R_a$.

$$BRDF_{ba}=(1/\lambda^2)\Phi_{ba}(\phi_2)R_a(\theta_i)G(f) \qquad (4)$$

In addition, BRDF may be approximated according to various methods, for example, as described below with respect to process flows 301 and 303.

The level of mathematical complexity used to represent the BRDF for any given embodiment may be chosen based on various factors. For example, the complexity of the BRDF function used may be determined considering the processing power and/or memory constraints of the device 100. Also, the complexity of the surface to be rendered may be considered. If a particular parameter (e.g., polarization, Fresnel reflection, etc.) has a negligible effect on BRDF for a given surface/illumination condition combination, that particular parameter may be dropped from the BRDF.

Figure 4:
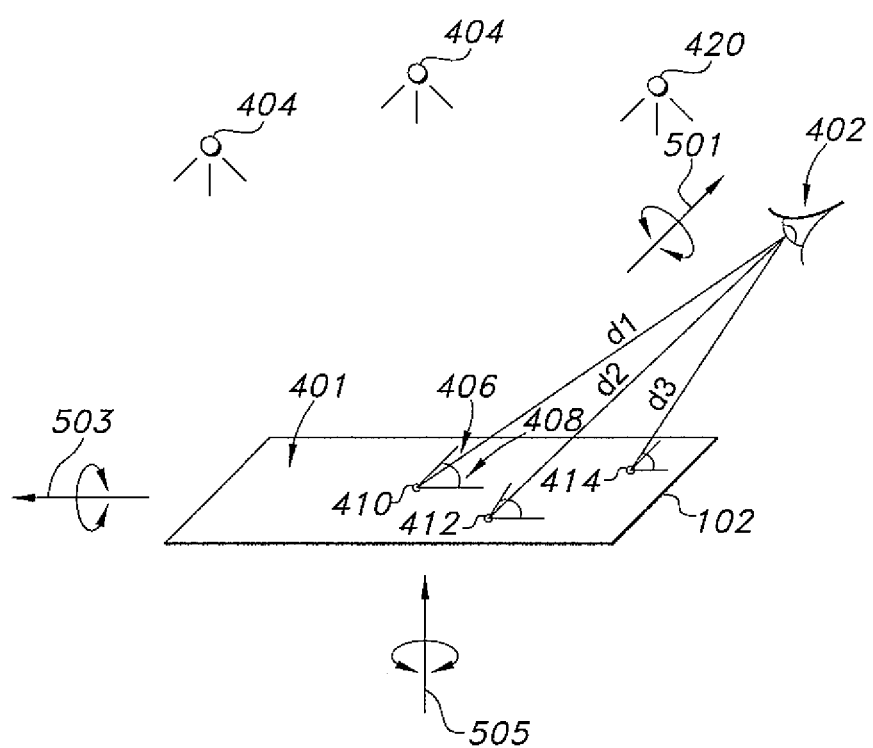
FIGS. 4 and 5 illustrate diagrams of displayed surfaces according to various embodiments of the present invention.
Figure 5:
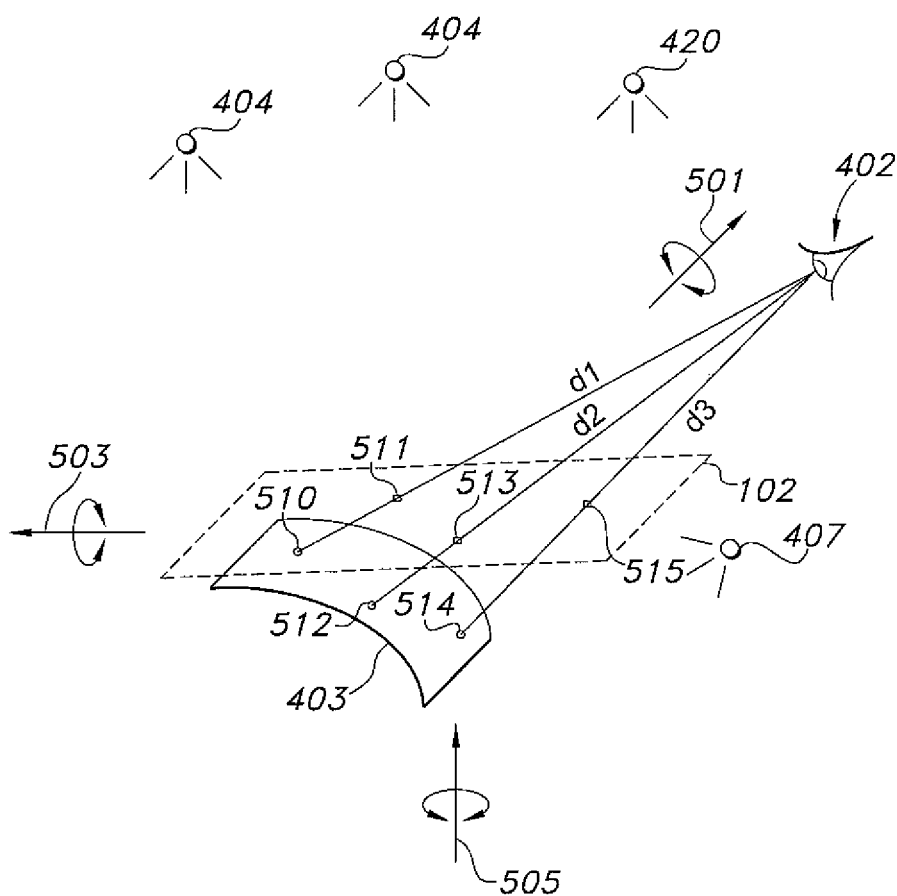

FIGS. 4 and 5 illustrate models of the appearance of respective surfaces 401 and 403 rendered on the display 102 of the device 100. For example, FIGS. 4 and 5 illustrate some example environmental factors that may contribute to f, and r described above, such as modeled ambient light sources 404. The modeled ambient light sources 404 may not be physically present, however, the displayed surface appearance may be modeled to behave as if they are. The modeled ambient light sources 404 may be selected to match the ambient light conditions of a desired location for the surface 401. For example, in an interior design application, the modeled ambient light sources 404 may be selected to match the ambient light conditions of a room where the surface (e.g., carpet, wall covering, etc.) will be located. In this way, the surfaces 401, 403 may be rendered on the display 102 to appear as they would in their intended location.

The modeled ambient light sources 404 may collectively bring about ambient illumination conditions, f such as Lux level, spectral content, dominate illumination direction(s), etc. Lux level may describe the general level of ambient light incident on the surfaces 401, 403. Spectral content may describe the spectral components of the ambient light. The dominant illumination direction or directions may represent the primary direction or directions from which ambient light is incident. If the appearance of the surface is modeled in an environment where there are one or a few ambient light sources 404, then there may be one or a few distinct dominant illumination directions. On the other hand, if the appearance of the surface is modeled in a diffuse ambient environment including multiple sources or diff-use sources, there may not be a dominant illumination direction. Also, according to various embodiments, the contributions of the individual modeled illumination sources 404 to Lux level, spectral content and illumination directions may be considered collectively or individually.

FIGS. 4 and 5 also illustrate environmental factors due to the spatial position, r, of points on the surfaces 401, 403 relative to the user's vantage point 402. For example, referring to FIG. 4, the distance d1 between point 410 and vantage point 402 as well as the angles 406, 408 may factor into r for the point 410. Similarly, the distances d2 and d3 between the vantage point 402 and respective surface points 412 and 414 as well as their viewing angles (not shown) may factor into their respective r's. It will be appreciated that some environmental conditions for a three dimensional surface 403 may be represented slightly differently than with a two-dimensional surface. For example, the distance from the vantage point 402 to the points 510, 512, 514 on the surface 403 may extend through the plane of the display 102. Also, for example, one or more modeled illumination sources 407 may be placed in the three-dimensional volume of the modeled surface. It will be appreciated that the spatial position of points on the surface 401, 403 may be expressed according to any suitable coordinate system.

Figure 3A:
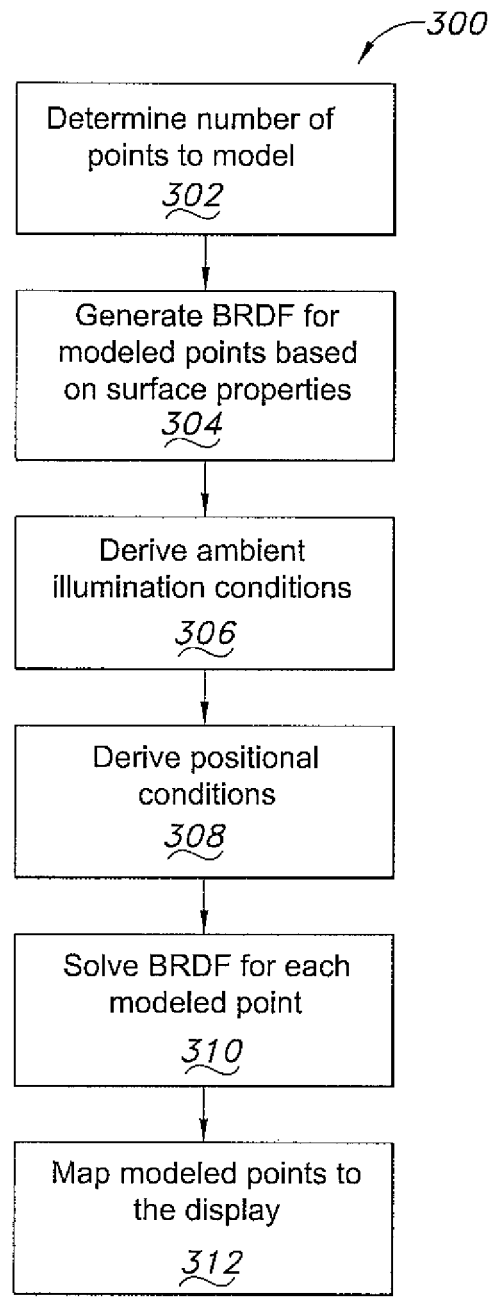
FIGS. 3A, 3B and 3C illustrate process flows according to various embodiments of the present invention.

FIG. 3A shows a process flow 300, according to various embodiments, that may be employed by the device 100 to model and display a surface appearance. It will be appreciated that the steps shown in process flow 300 may be preformed in any suitable order. At step 302 the device 100 may determine how many points on the surface will have their appearance modeled. The number of appearance points to be modeled may be determined based on various factors. For example, if the surface to be modeled has a relatively smooth pattern/texture or is to be rendered from a remote vantage position, relatively fewer points may be considered. Also, the number of points to be modeled may be a function of the processing power of the processor 104 and/or the resolution (e.g., member of pixels present) in the display 102.

At step 304, a BRDF may be generated to represent the appearance of the surface at each of the points. The BRDF may be derived based on information regarding, color, texture and/or other perceptual spatial effects stored, for example, at data storage 105. According to various embodiments, the actual combination of color texture, etc., used to generate the BRDF's may be received from a user. For example, the user may select various surface features from a menu provided on the display 102.

At step 306, the ambient illumination conditions under which the surface appearance will be modeled may be received and/or derived. The ambient illumination conditions may be represented as one set of values describing all ambient illumination (e.g., Lux level, spectral content, dominant illumination direction) or as the individual contributions of individual modeled light sources 404, 407. For example, if there are a large number of illumination sources, or the modeled illumination is to be diffuse, then one set of values generally describing the ambient illumination may be used. In contrast, if there are only a few modeled illumination sources 404 or the modeled sources 404 are not diffuse, then the contribution of each may be considered individually. According to various embodiments, a user may specify actual values of Lux level, spectral content, etc. describing individual illumination sources. The device (e.g., with processor 104) may then determine whether to model the sources individually or collectively and derive the relevant values.

At step 308, the directional position of each surface appearance point relative to a vantage point may be determined. For example, the distances (e.g., d1, d2, d3, etc.) and angles (e.g., 406, 408) between the vantage point 402 and each appearance point may be found. According to various embodiments, the location of the vantage point 402 may be assumed. For example, it may be assumed that a typical user looks at the display 102 and holds it at a given angle and distance relative to their eyes. Also, according to various embodiments, the location of the vantage point 402 may be entered and/or modified by the user. It will be appreciated that the physical distance between the surface and vantage point may have a substantial effect on surface appearance, especially for surfaces with extreme texture.

At step 310, the BRDF functions for each modeled point may be solved over a desired range of wavelengths given the environmental conditions derived at steps 306 and 308. According to various embodiments, the desired wavelength range may include a series of wavelengths across the visible spectrum. The precise wavelengths and wavelength intervals may be determined according to any suitable method. The result may be a modeled appearance of the surface at each point.

The appearances of each modeled point may be mapped to the display 102 at step 312, causing the display 102 to show an appearance of the surface. When the surface is two-dimensional, such as surface 401 shown in FIG. 4, there may be a one-to-one correlation between each modeled point and a pixel or group of pixels on the display 102. In various embodiments, however, the number of modeled points may exceed the number of available pixels. In this case, the appearance of multiple points may be averaged or otherwise aggregated at a single pixel or pixel group. With a three-dimensional surface, such as surface 403 shown in FIG. 5, it is possible that the shape of the surface 403 may cause more than one modeled point to map to the same pixel or pixel group. When this occurs, appropriate corrections may be made according to any suitable method. For example, when one of the points on the surface tends to obscure another relative to the vantage point 402, the relevant pixel or pixel group may display the appearance of the point that is nearest to the vantage point 402. Also, for example, a pixel that is mapped to multiple points may display the average or other aggregate of the appearance of the points. Also, when a three-dimensional surface 403 is mapped to the display 102, the mapping may be based on facets, vertices, or any other suitable way of representing the three-dimensional surface 403.

Figure 3B:
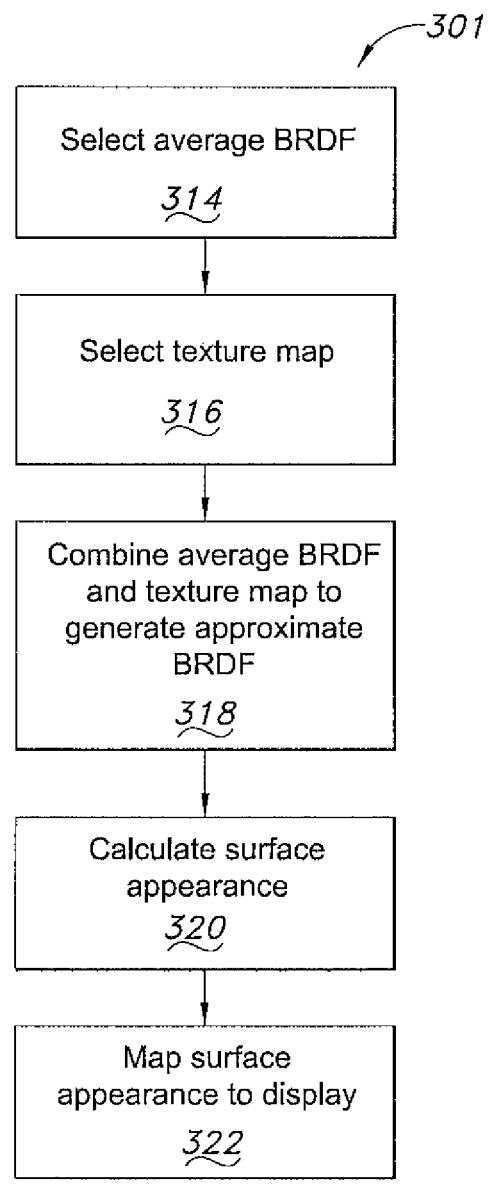

When using some existing graphics hardware/software, it may not be practical to derive and solve a complete BRDF for each modeled point on a surface, as described above. Instead, it may be preferable to make approximations for the various BRDF components to generate an approximate surface appearance. The process flow 301, shown in FIG. 3B describes such a method utilizing approximations of the BRDF. At step 314, an average BRDF may be selected for a surface to be displayed. The average BRDF represents an average value of the BRDF over all points on the surface without considering texture. For example, the average BRDF may convey color, and may be stored at the color database 106. The average BRDF may also convey various other information about the surface including, for example, an equivalent model of the coating/surface, the average overall particle size/dielectric constant, complex refractive index, etc. The average BRDF may be selected and/or derived from a pre-existing color library, such as the MUNSELL, PANTONE, and/or NCS color libraries.

At step 316, a texture map for the surface may be selected. The texture map may represent a portion of the complete BRDF due to surface texture, including relief texture as well as subsurface features (e.g., metal flakes in pearlescent auto finishes, etc.). The texture map may be selected by the user from a pre-measured and/or modeled selection of texture maps (e.g., stored at database 108). The texture map may take any suitable form. For example, the texture map may be represented as a spatial frequency and amplitude. Also, the texture map may include the measured physical dimensions of an actual surface and/or an image of a given surface texture with color information removed (e.g., a grayscale image).

At step 318, the average BRDF and texture map may be combined to form an approximation of the complete BRDF. This approximate BRDF may mathematically express the appearance of the surface for each modeled point on the surface in terms of one or a number of environmental factors. The environmental factors may include any other factors that affect the appearance of the surface including, for example, observed wavelength, ambient illumination conditions, and positional conditions, as described above. The number of points whose appearance is to be modeled may be determined, for example, based on the resolution of the available texture map. At step 320, the approximate BRDF may be solved for each point given a set of model environmental factors. The set of model environmental factors may be default factors, or may be selected by the user, for example, as described above. The result of solving the approximate BRDF may be a set of pixel values or a modeled surface appearance, which may be mapped to the display 102 at step 322.

Figure 3C:
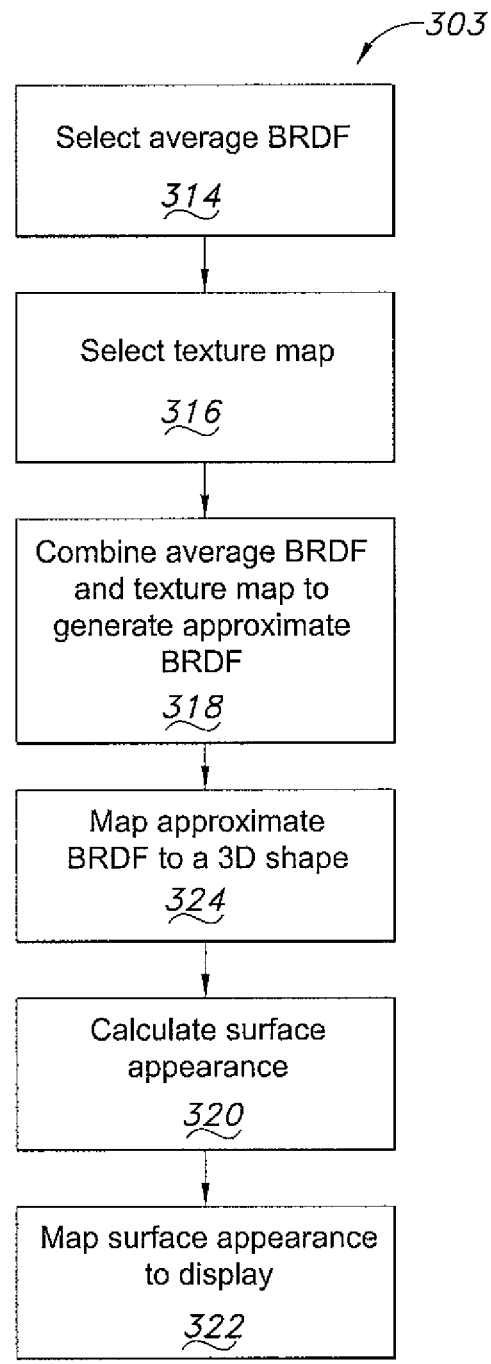

When the surface to be displayed is a three-dimensional surface, the process flow 301 may be modified, for example, as shown by process flow 303 shown in FIG. 3C. According to the process flow 303, an additional step 324 is added to the process flow 301. After the average BRDF and texture map are combined at step 318, the resulting approximate BRDF is mapped to a three-dimensional shape (e.g. surface 403) at step 324. The three-dimensional shape may be, for example, a shape chosen from shape database 110. The approximate BRDF may then be solved for the set of environmental conditions at step 308 and mapped to the display 102 at step 322.

According to various embodiments of the process flows 300, 301, 303, after the surface appearance is displayed, the user may be able to adjust various environmental factors in real time or near real time (e.g., using the thumb wheel 204, directional switch 202 and/or touch screen 206). For example, the vantage point 402 and/or modeled illumination sources 404, 407 may be virtually moved relative to the surfaces 401, 403. Also, the surfaces 401, 403 themselves may be moved relative to the sources 404 and/or vantage point 402 by virtually rotating them about axes 501, 503, 505. In response, the device 100 may recalculate the surface appearance given the changed environmental factors and display the modified surface appearance.

Figure 6:
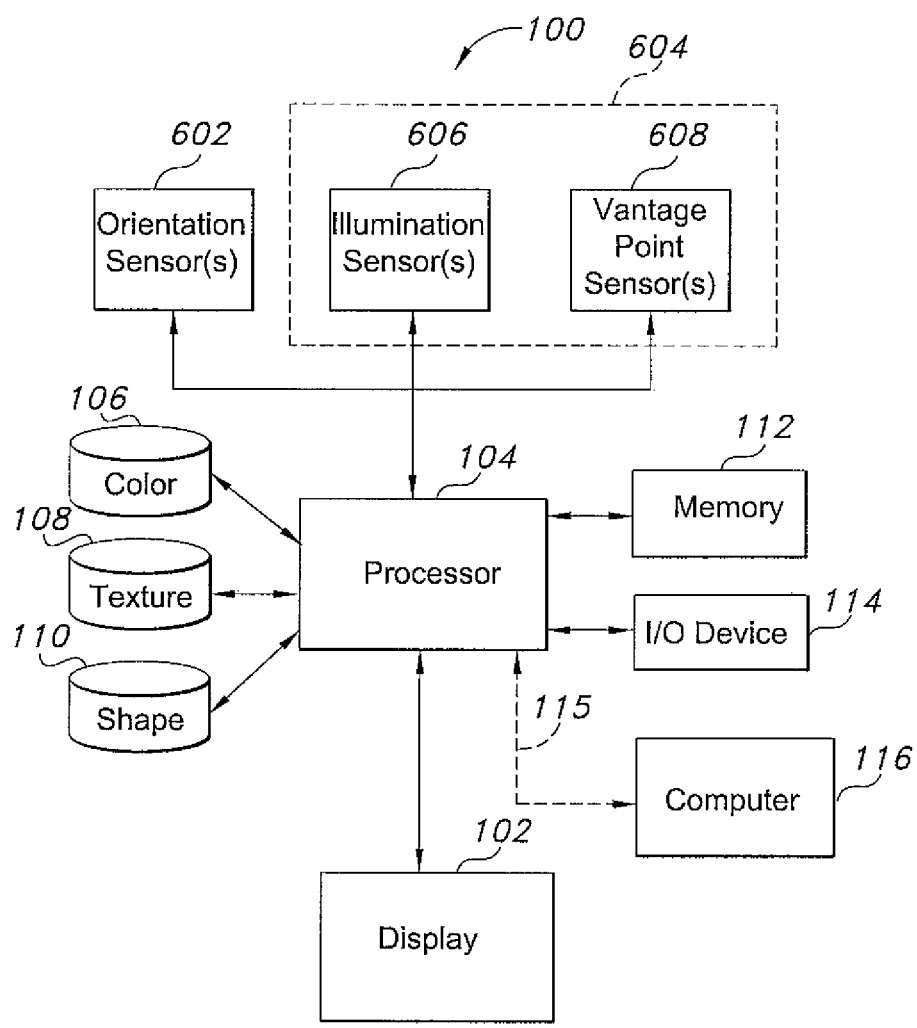
FIG. 6 illustrates a block diagram of a device according to various embodiments of the present invention.
Figure 7:
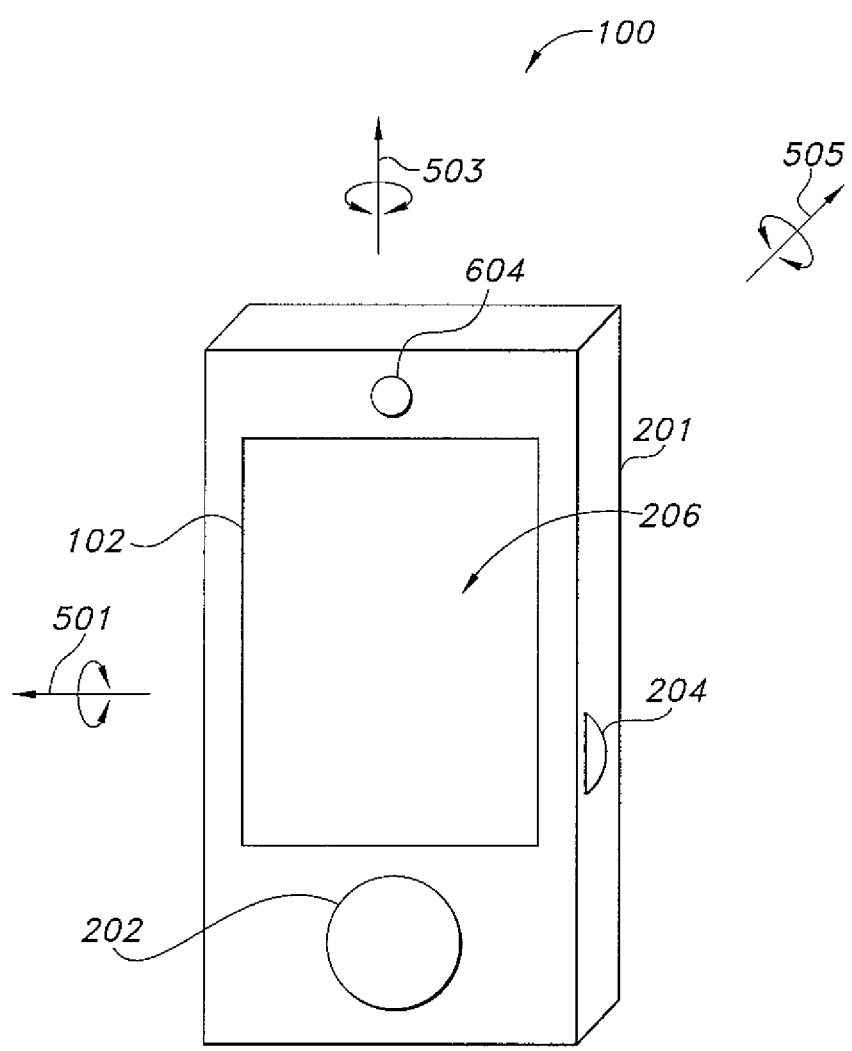
FIG. 7 illustrates a diagram of a handheld device having environmental condition sensors according to various embodiments of the present invention.

As shown by FIGS. 6 and 7, the device 100, according to various embodiments, may include a sensor or sensors for sensing environmental factors such as, for example, orientation sensor(s) 602, illumination sensor(s) 606 and/or vantage point sensor(s) 608. Readings from the sensors 602, 606, 608 may be used to model a surface appearance as though the surface is interacting with the actual environment of the device 100. Also, the readings may be used to cancel out the effects of actual environmental conditions, allowing the device 100 to more accurately model a surface appearance according to desired or modeled environmental conditions.

Orientation sensor(s) 602 may sense the pitch, roll and yaw of the device, for example, about axes 501, 503 and 505 shown in FIGS. 4, 5 and 7. As the device 100 rotates about the axes 501, 503, 505, it can be appreciated that environmental factors considered in generating the surface appearance may change (e.g., dominant illumination direction, vantage point 402 location, etc.). Accordingly, the processor 104 may consider this pitch, roll and yaw of the device 100 and calculate appropriate changes to environmental factors. According to various embodiments, resulting changes to the displayed appearance of the surface 401 or 403 may be updated in real time or near real time. In this way, as the user tilts and rotates the device 100, the surface appearance shown by the display 102 may behave as though the user is tilting and rotating an actual sample.

Orientation sensors 602 may be placed within the enclosure 201 and may include any suitable types of sensors capable of sensing motion of the device 100 about one or more of the axes 501, 503, 505. For example, sensors 602 may include a micro-electro-mechanical (MEM) gyroscopic sensor or sensors, such as those available from INVENSENCE CORP. of Santa Clara Calif. Sensors 602 may also include one or more inclinometers, accelerometers, etc., instead of or in addition to gyroscopic sensors. When the user is encouraged to tip, tilt or rotate the device 100, as described, the user's viewing angle relative to the display 102 may physically change. The degree to which the user may vary the viewing angle may be limited by the field of view of the display 102. Accordingly, it may be preferable to select a display 102 with a relatively wide field of view, such as, for example, a TFT LCD display, an electronic paper/ink display, an OLED display, etc.

Illumination sensor(s) 606 may sense ambient illumination conditions surrounding the device 100 including, for example, Lux level, spectral content, and dominant illumination direction. Because of the illumination sensor(s) 606, the device 100 may be able to consider the effects of real illumination sources 420 (FIGS. 4 and 5) in modeling and displaying a surface appearance instead of, or in addition to the effects of modeled sources 404, 407. For example, an appearance of the surface (e.g., 401, 403) may be rendered on the display 102 as though the surface is interacting with one or more real illumination sources 420. Also, if desired, the surface appearance may be rendered based on the contributions of modeled sources 404 alone by canceling out the contributions of real source(s) 420. It will be appreciated that when a reflective rather than an emissive display 102 is used, it may not be necessary to consider, at least the specular effects of real sources 420, except when it is desirable to cancel them. This is because real sources 420 will physically interact with a reflective display in a way similar to the way that they interact with many surfaces. According to various embodiments, the illumination sensor(s) 606 may be implemented as a CMOS imaging module, embedded camera, or any other sensor capable of capturing an image. The processor 104 may then derive ambient illumination conditions considering a captured image.

The vantage point sensor 608 may be used to locate the vantage point 402 and may also be implemented as a CMOS imaging module, embedded camera, or similar device. The location of the vantage point 402 may be derived from the resulting images. For example, a human eye or eyes may be identified in the image according to any suitable algorithm. It may be assumed that the eye or eye(s) are directed toward the display 102. Also, the distances to the respective points (e.g., d1, d2, d3) may be assumed based, for example, on the orientation of the device 100 as sensed by the orientation sensors 602. For example, when the user holds the device 100 at a position near eye level, they may tend to initially hold it at a more upright angle than when they hold it at a position near the waist. The distances may also be derived by considering the complexity of the surface. For example, when a displayed surface has many fine features, the user may tend to hold the display 102 closer to the eyes.

From the position of the eye(s) in the image, the direction of the eye(s), and the distances (e.g., d1, d2, d3), the vantage point 402 position may be derived and incorporated into the dependant environmental factors considered by the BRDF or approximate BRDF (e.g., as the vector r). Also, according to various embodiments the vantage point sensor 608 and illumination sensor 606 may be implemented as a single sensor 604 with both vantage point position and illumination information derived from resulting images.

Figure 8:
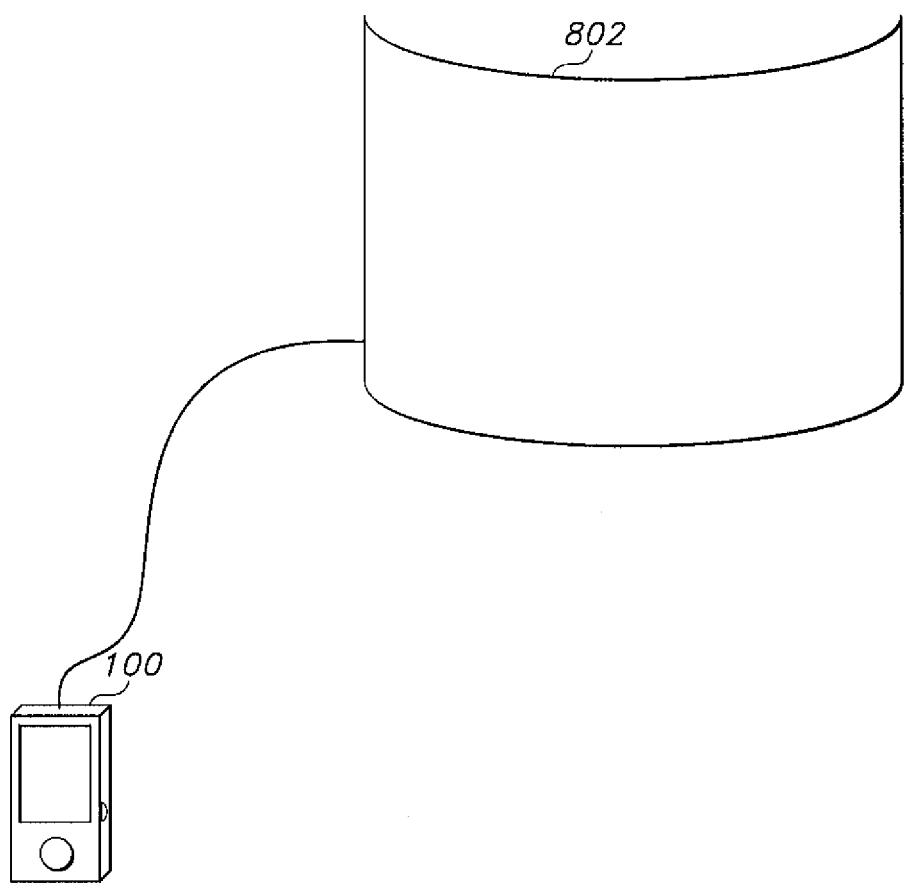
FIG. 8 illustrates a hand held device with a flexible display according to various embodiments of the present invention.

FIG. 8 shows the device 100, according to various embodiments, including a flexible display 802. The flexible display 802 may be constructed according to any suitable display technology including, for example, the electronic ink and/or OLED technologies described above. The flexible display 802 may be in communication with the device 100 according to any wired or wireless interface. The flexible display 802 may be provided in addition to or instead of the display 102. Because the display 802 is provided separate from the device 100, the display 802 may include orientation and/or image sensors (not shown) embedded therein for sensing environmental conditions relative to the display 802. The flexible display 802 may be used to model the appearance of a surface over an existing object or shape (e.g., a can, fender or other curved feature or container). According to various embodiments, the flexible display 802 may be provided pre-formed into an existing object shape (e.g., the shape of a car fender or other commonly modeled surface). Also, for example, the display 802 itself may be physically placed over or around the existing object or shape.

Figure 9:
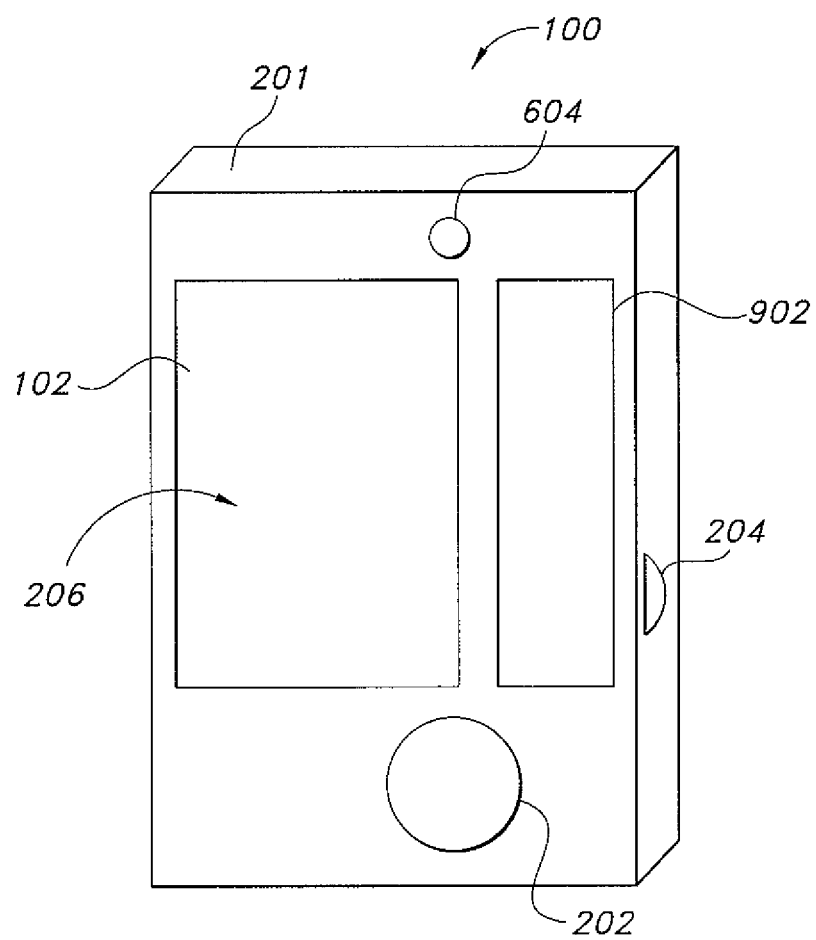
FIG. 9 illustrates a hand held device providing tactile feedback according to various embodiments of the present invention.

According to various embodiments, it may be desirable to provide tactile feedback to a user of the device 100 regarding the touch or feel of the surface 401, 403. Accordingly, the device 100 may include a texture plaque or chip. The texture plaque may exhibit a variable texture based on input. For example, the texture plaque may include a MEM device having multiple retractable features, and/or may include an electrostatic device capable of recreating the sensation of texture. The texture plaque may be in communication with the processor 104 and may receive as input a texture map, such as the texture map described above with respect to the approximate BRDF. In response, the texture plaque may generate a tactile surface that, to the touch, approximates the physical texture of the surface (e.g., as derived from texture map). According to various embodiments, the texture plaque may be substantially transparent and may be positioned over the display 102. This may allow the user to see and touch a modeled surface at the same location. According to certain embodiments, the texture plaque may be embedded within the enclosure 201 in a field 902 separate from the display 102, for example, as shown by FIG. 9.

Figure 10:
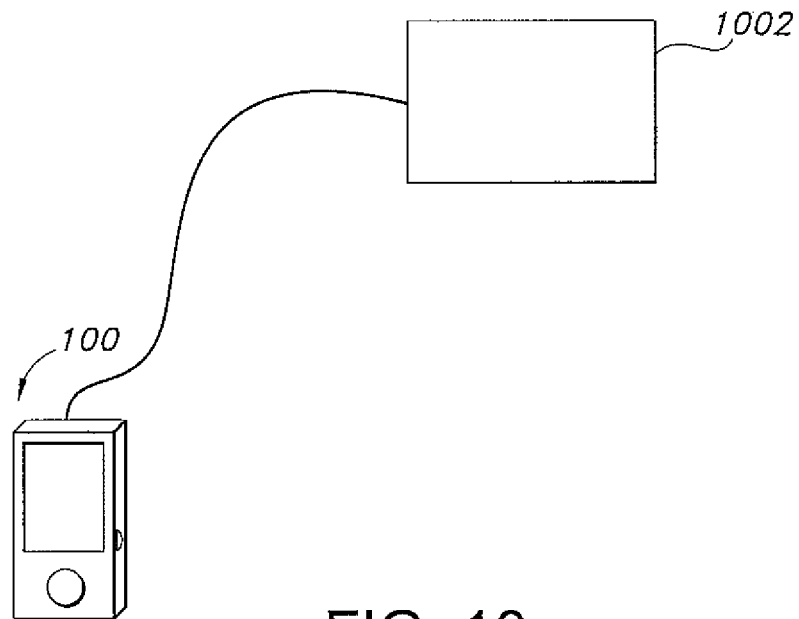
FIGS. 10 and 10A illustrate a hand held device with a transparent or translucent display according to various embodiments of the present invention.
Figure 10A:
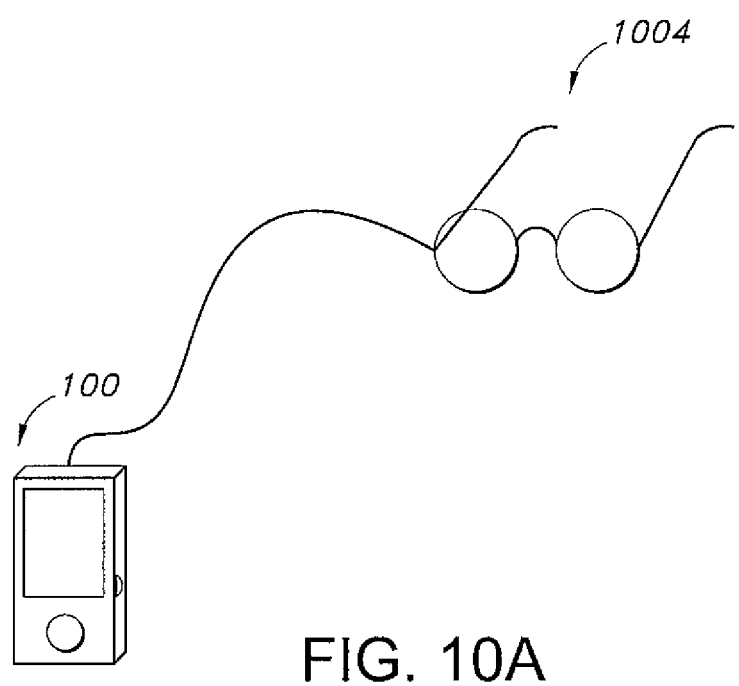
Figure 11:
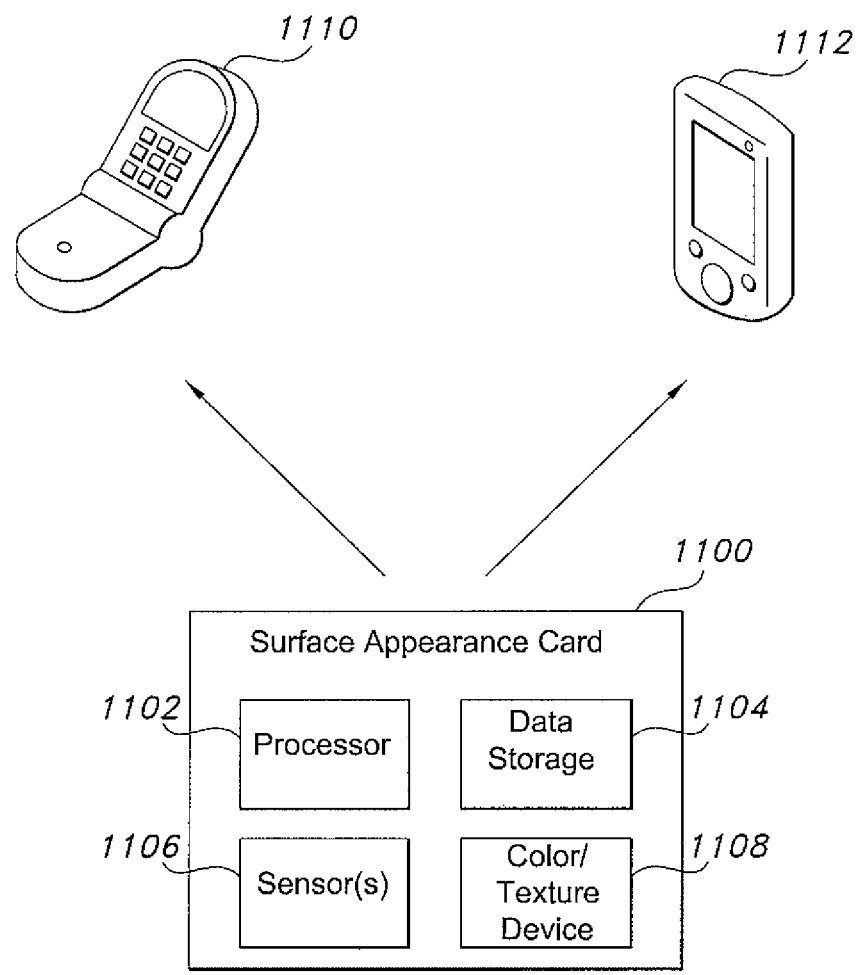
FIGS. 11 and 12 illustrate units for implementing surface appearance rendering with preexisting devices according to various embodiments of the present invention.

FIG. 10 shows an embodiment of the device 100 provided with a transparent and/or translucent display 1002. The display 1002 may be constructed according to any suitable method. For example a translucent or transparent display 1002 may be constructed according to LCD, OLED and/or electronic paper/ink technologies by omitting a backlight and/or diffuser material that might otherwise be positioned behind a display. The device 100 may exploit the additive and/or subtractive properties of colors shown by the display 1002 to allow a user to visualize an existing surface with a different perceptual appearance. For example, the user may view a bare floor through the display 1002. The device 100 may render a color and/or texture on the display 1002 that when viewed in conjunction with the bare floor may cause the user to perceive the bare floor with a desired tile and/or carpet style, color, texture, etc. According to various embodiments, the display 1002 may be implemented as a pair of glasses and/or goggles 1004 as shown in FIG. 10A. The display 1002 and/or glasses 1004 may be in communication with the device 100 via any suitable wired or wireless communication link. Also, the display 1002 may include versions of sensors 602, 604 to sense environmental conditions relative to the display 1002.

Many of the embodiments described herein can be implemented as stand-alone devices. It will be appreciated, however, that the functionality of the device 100 may be implemented on any other instrument having a screen, sensors, data storage, etc., as desired. For example, devices such as cell phones, personal digital assistants (PDA's), computers, televisions, etc., may be manufactured with the functionality of the device 100.

According to various embodiments, the functionality of the device 100 may be added to a variety of other devices. For example, a surface appearance card 1100 may be provided with a processor 1102, data storage 1104, sensors 1106, and a color/texture device 1108 as described in more detail below. The surface appearance card 100 may be introduced into another device, such as cell phone 1110 or PDA 1112. For example, the surface appearance card 1100 may be configured to mimic a flash memory card or other peripheral device and may be received into a peripheral device socket of the device 1110 or 1112. The card 1100 may then allow the device 1110 or 1112 to model and display surface appearances on their preexisting displays. According to various embodiments, the card 1100 may interrogate the device display and modify the rendered surface appearances according to the capabilities of the display (e.g., resolution, field of view, etc.). Also, it will be appreciated that certain components of the card 1100 may be omitted based on the device into which it will be introduced. For example, the card 1100 may utilize a processor, data storage, and/or sensors already included in the device 1110 or 1112.

Figure 12:
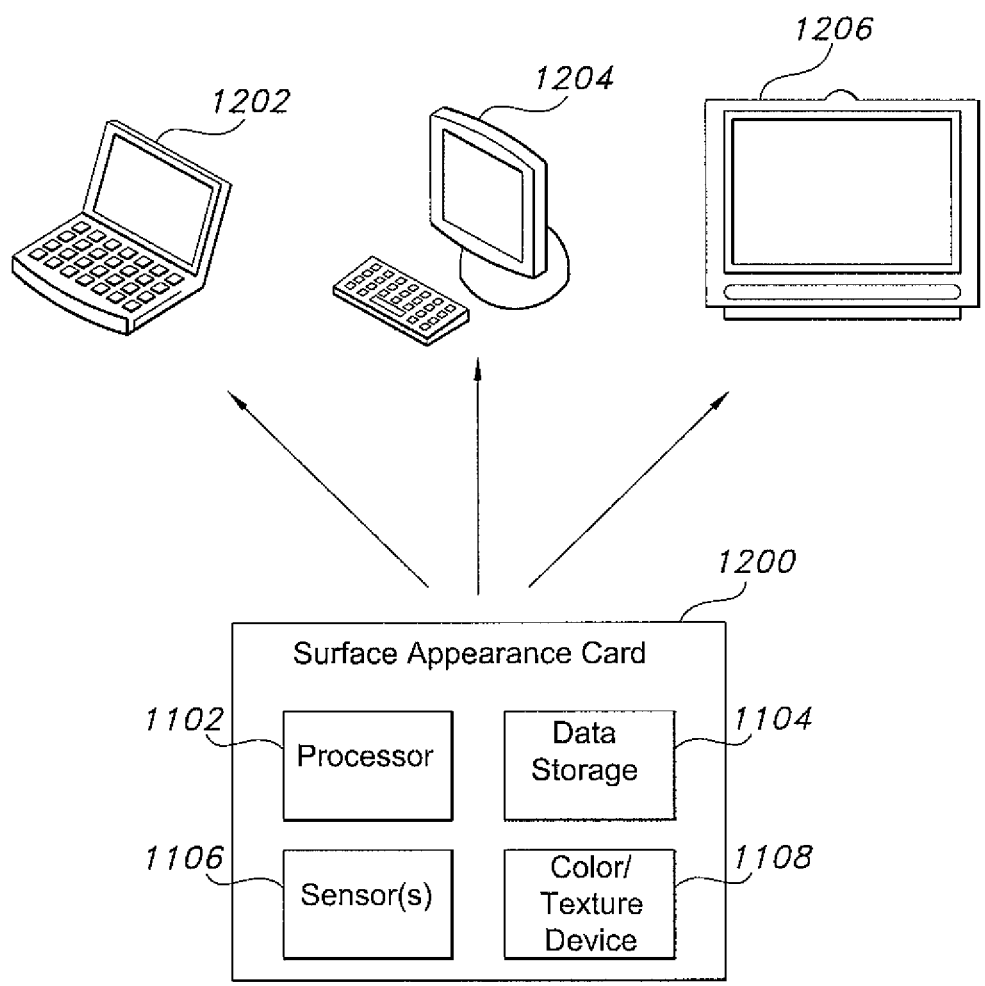

FIG. 12 shows a surface appearance unit 1200 that is similar to the surface appearance card 1100. The unit 1200 may be used in conjunction with other devices such as, for example laptop computer 1202, desktop computer 1204 and/or television 1206. The unit 1200 may interface with the devices 1202, 1204, 1206 according to any suitable method. For example, the unit 1200 may mimic the form of a flash memory card, PCMCIA card or any other suitable peripheral that may interface with the devices 1202, 1204 and 1206. According to various other devices, the unit 1200 may take the form of a box that connects to the devices 1202, 1204, 1206 according to any suitable wired or wireless communication interface including, for example, a Universal Serial Port (USB) interface, an RCA jack interface, an S-Video interface, etc. According to various embodiments, the unit 1200 may simply be an example of the device 100 described above with a suitable jack for communicating with the devices 1202, 1204, 1206. Also, it will be appreciated that various devices 1202, 1204, 1206 may be independently designed to have the functionality of the device 100.

Figure 13:
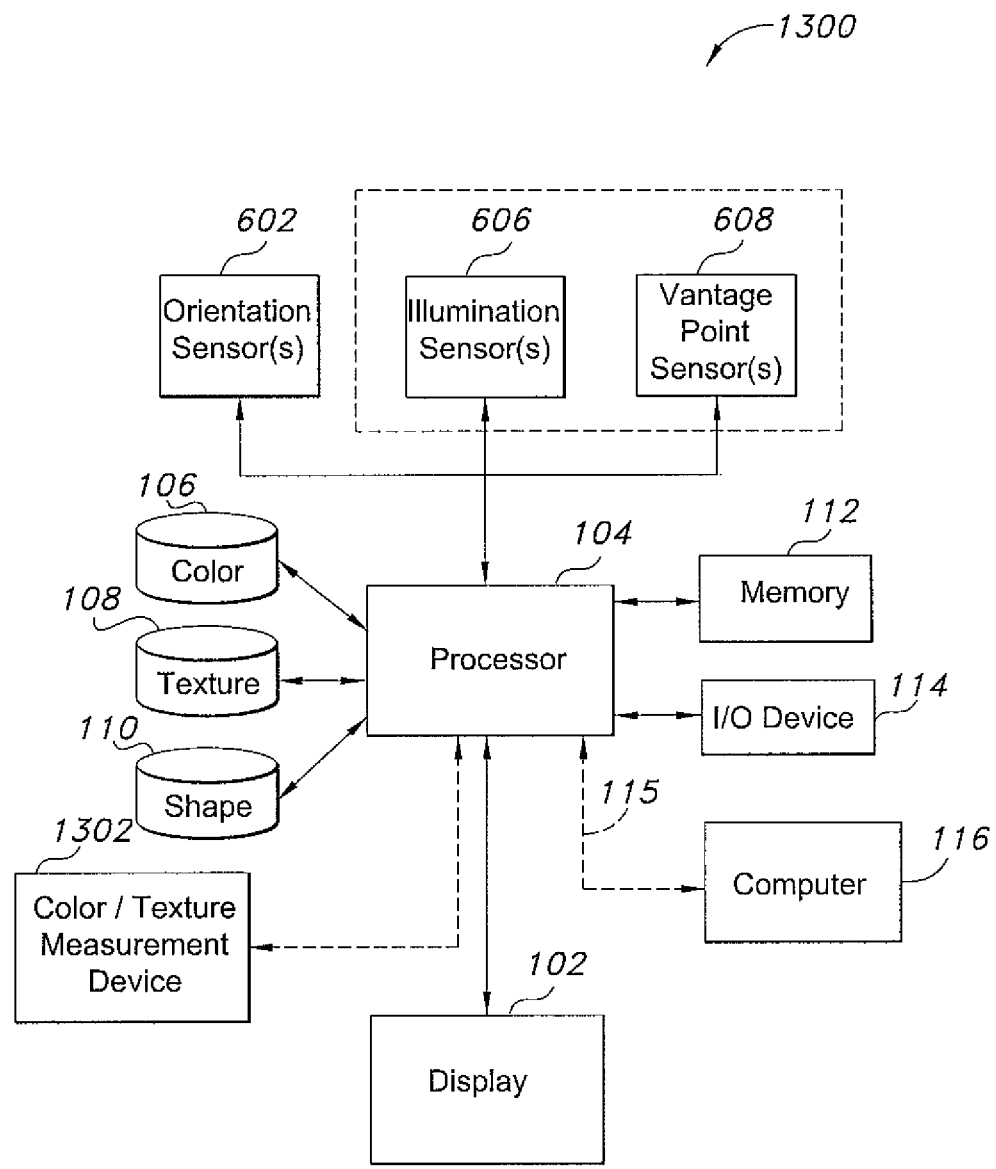
FIG. 13 illustrates a block diagram of a device according to various embodiments of the present invention.

According to various embodiments, the device 100 described herein may be coupled with the capability to capture surface properties of real surfaces (e.g., color, texture, BRDF, etc.). For example, FIG. 13 shows a hybrid device 1300 including a surface measurement device 1302. This may allow the user to measure properties of an existing surface, store the surface properties in the device 1300 or other storage, and later use the device 1300 to recreate an appearance of the existing surface. For example, an interior designer who wants to select a carpet to match an existing wall covering in a room may measure and store surface properties of the wall covering. The designer may then take the device 1300 to a store and use it to model an appearance of the wall covering for comparison with carpet samples. At the store, the designer may also measure surface properties of potential carpet samples and, using the device 1300, render an appearance the carpet samples, for example, according to illumination or other environmental conditions that are prevalent in the room. This are but a few examples of how the device 100 could be used.

Referring back to FIG. 13, the surface measurement device 1302 may include one or more of a colorimeter, a flatbed scanner, a laser surface scanner, a simple camera, a hyperspectral camera, an artificial retina, etc. According to various embodiments, the device 1302 may include a spectrophotometer capable of measuring the BRDF of a surface. For example, suitable spectrophotometer designs are disclosed in U.S. patent application Ser. No. 11/410,451, filed Apr. 25, 2006 by Nisper et al.; U.S. patent application Ser. No. 11/504,120, filed Aug. 15, 2006 by Nisper et at; and U.S. patent application Ser. No. 11/504,187, filed Aug. 15, 2006 by Nisper et at, the contents of which are incorporated herein by reference.

It will be appreciated that the appearance of a surface may be recreated from the surface BRDF measured by a spectrophotometer or similar instrument. According to various embodiments, the BRDF may used directly to calculate the appearance of the surface at each point or pixel considering relevant environmental conditions, for example, as described above with respect to process flow 300. Alternatively, an average BRDF and texture map may be derived from the full BRDF and used, for example, as described above with respect to process flows 301, 303.

According to other various embodiments, the device 1302 may comprise a calorimeter or other color measuring device and a second instrument for generating a texture, such as a multi-angle illuminator, flatbed scanner, or laser scanner. Again, these devices may be integrated into the device 1300 or simply placed in communication with it. The colorimeter or other color measuring device may be any suitable calorimeter including, for example, model DTP22, available from X-RITE. The colorimeter may be used to measure a quantity equivalent to the color of the device and/or the average BRDF described above. The other texture instrument may then be used to generate a texture map. For example, a multi-angle illuminator such as the PLATE SCAN available from X-RITE may be used. A multi-angle illuminator may be able to generate an orientation dependent texture map of a surface because it is able to illuminate the surface from multiple angles. Alternatively, a flat bed scanner may be used to generate the texture map. Because many flat bed scanners only illuminate from one direction, however, multiple readings from different surface orientations may be combined to generate a robust texture map. Also, it will be appreciated that texture may be measured directly using a laser scanner or other similar device. According to various embodiments, a texture map scanning device may be omitted, and a texture map for recreating a surface scanned by the colorimeter may be recreated using a texture map selected from the texture database 108.

Figure 14:
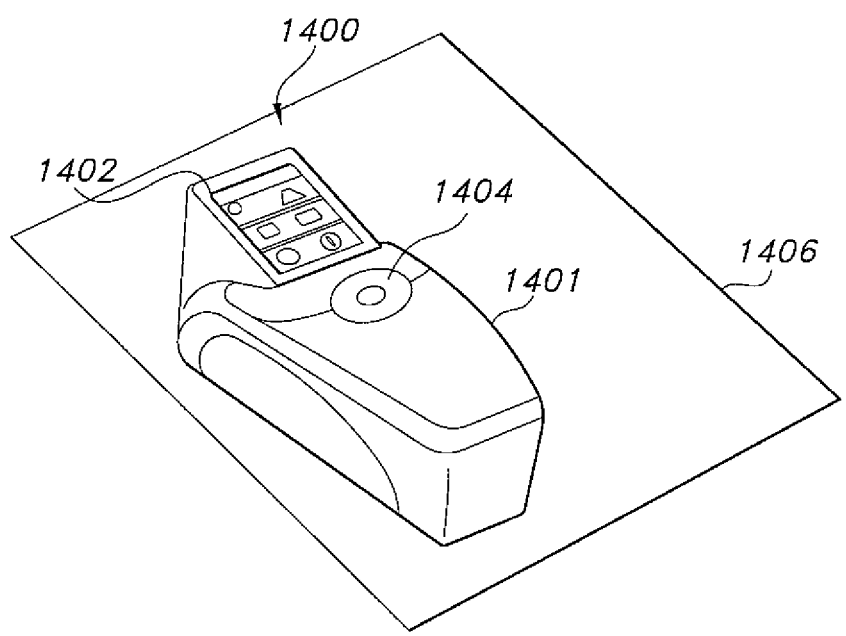
FIGS. 14-15 illustrate a device according to various embodiments of the present invention.
Figure 15:
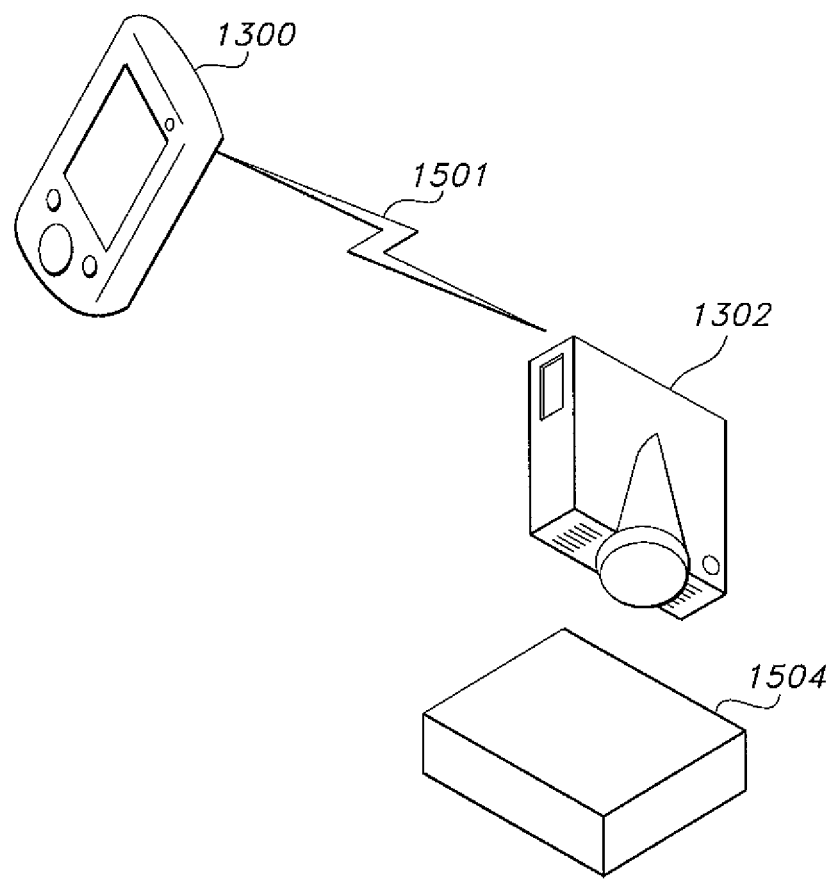

As described, the surface measurement device 1302 may be integrated with the device 1300, or may be a stand-alone unit in communication with the device 1300. For example, FIG. 14 illustrates a device 1400 having embedded surface measurement capabilities. The device 1400 comprises an enclosure 1401, a display 1402 and an input device 1404. The enclosure 1401 may also contain various illumination and sensor modules (not shown) directed toward the surface 1406. In this way the device 1400 may measure properties of the surface 1406 and display a modeled surface appearance at display 1402. FIG. 15 shows an example of the device 1300 in communication with a surface measurement device 1302 positioned to measure a property of the surface 1504. The surface measurement device 1302 is shown in communication with the device 1300 via a communications link 1501, which may include any suitable wired or wireless communication link.

According to various embodiments, the devices 100, 1300 may include functionality for matching and/or selecting colors/surface appearances. According to various embodiments, the devices 100, 1300 may select a surface appearance that matches or complements a second surface appearance. For example, the user may select a first surface appearance from the various databases 106, 108, 110 or by scanning a physical surface as described above. The device 100, 1300 may then select a second surface appearance considering the first appearance. For example, the device 100, 1300 may select a second surface appearance that is equivalent to the first. This may be useful, for example, to match coatings in an auto body repair setting. According to various embodiments, both surface appearances may be displayed on the display 102 simultaneously.

According to various embodiments, the second surface appearance may be selected to complement the first. For example, an interior designer may measure the surface appearance of a first object in a room and select a wall or floor covering surface appearance based thereon. The complementary surface appearance may be selected according to any suitable criteria. For example, the complementary surface appearance may be selected based on color theory (e.g., dyadic and triadic colors). Also, the complementary surface appearance may be selected based on color and appearance relationships that are currently popular or trendy. In addition, the complementary surface appearances may be selected based on input from the user. For example, the devices 100, 1300 (e.g., via display 102) may prompt the user to enter information to help identify the complementary/trendy surface appearance. The information may include, for example, illumination characteristics of a room or place where the second surface will be located, other colors or surface appearances to be used nearby, texture differences between surfaces in the room or area, etc.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, mini-computer, laptop, personal data assistant (PDA), cellular phone, pager, processor, including wireless and/or wireline varieties thereof, a virtual computer system and/or any other computerized device or construct capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict aisles between that incorporated material and the existing disclosure material.

The invention claimed is:

1. A system for generating and displaying a modeled appearance of a surface of interest on an electronic visual display device, the system comprising:
   a display device;
   an illumination sensor;
   an orientation sensor adapted to sense at least one of the roll, pitch or yaw of the display device; and
   a processor in communication with the illumination sensor, the orientation sensor and the display device, the processor programmed to:
      derive an ambient illumination condition of one or more real illumination sources for the display device from an output of the illumination sensor;
      derive an orientation of the display device from an output of the orientation sensor; and
      generate modeled appearance data for the surface of interest based at least in part on an average BRDF of the surface comprising a color selected from a pre-existing color library, the ambient illumination condition of the display device, and on the orientation of the display device;
   wherein the display device receives modeled appearance data for the surface of interest from the processor and displays the modeled appearance of the surface of interest.

2. The system of claim 1, wherein the ambient illumination condition includes a condition selected from the group consisting of Lux level, ambient spectral content and dominant illumination direction.

3. The system of claim 1, wherein the processor is further programmed to regenerate the modeled appearance data for the surface in response to a change in the ambient illumination condition.

4. The system of claim 1, further comprising a vantage point sensor for sensing a viewer relative to the display device, wherein the processor is in communication with the vantage point sensor and is further programmed to derive a vantage point location of the viewer relative to the display device from an output of the vantage point sensor.

5. The system of claim 4, wherein deriving a vantage point location of the viewer comprises locating an eye of the viewer.

6. The system of claim 4, wherein the processor is further configured to regenerate the modeled appearance data for the surface in response to a change in the vantage point location.

7. The system of claim 1, wherein the processor is further programmed to regenerate the modeled appearance data for the surface in response to a change in the output of the orientation sensor.

8. The system of claim 1, wherein the display device is a reflective display.

9. The system of claim 1, further comprising an enclosure housing the processor and the display.

10. The system of claim 1,
   wherein the processor is further programmed to:
      calculate a plurality of Bidirectional Reflectance Distribution Functions (BRDF's) for the surface of interest, wherein each of the plurality of the BRDF's correspond to one of a plurality of points positioned on the surface, with the plurality of BRDF's being based at least in part on the orientation of the device, and being communicated to the display device.

11. The system of claim 1, further comprising data storage that stores a color database containing a plurality of surface colors and a texture database containing a plurality of surface textures; wherein the at least one surface property includes texture data describing at least one of the surface textures selected from the texture database and color data describing at least one of the surface colors selected from the color database.

12. The system of claim 1, wherein the display device is an emissive display.

13. The system of claim 1, wherein the display device is an transparent display device.

14. The system of claim 13, wherein the display device displays additive or subtractive properties relative to an surface visible through the transparent display.

15. The system of claim 1, wherein the display device includes a texture plaque.

16. The system of claim 1, wherein the orientation sensor is adapted to measure at least two of the roll, pitch and yaw of the display device.

17. The system of claim 1, wherein the orientation sensor is adapted to measure all of the roll, pitch and yaw of the display device.

18. The system of claim 1, wherein the display device is a flexible display.

19. The system of claim 1, wherein the display device is part of a computing device capable of functioning independently of the processor, but with the processor connected in communication in with the computing device being configured to transfer modeled appearance data for the surface to the computing device for being shown on the display device.

20. The system of claim 1, wherein the processor is further programmed to select and display a color that is a dyadic complementary color to the modeled appearance of the surface of interest.

21. The system of claim 1, wherein the processor is further programmed to select and display colors that comprise triadic complementary colors to the modeled appearance of the surface of interest.

22. The system of claim 1, wherein the processor is further programmed to render the modeled appearance of the surface of interest such that it appears as if it were interacting with one or more of the real illuminations sources.

23. The system of claim 1, wherein the processor is further programmed to render the modeled appearance of the surface of interest such that it cancels out the one or more real illuminations sources.

24. A system for generating and displaying a modeled appearance of a surface of interest on an electronic visual display device, the system comprising:
   a display device;
   a database comprising a pre-existing color library;
   a surface measurement device configured to measure a color and a texture of a surface of interest, and
   a processor programmed to:

communicate with the surface measurement device and the display device, and generate modeled appearance data for the surface of interest based at least in part on (i) an average BRDF comprising a color selected from the pre-existing color library that corresponds to the measured color, (ii) the texture of the surface of interest, and (iii) at least one environmental factor for the display device;

wherein the display device receives modeled appearance data for the surface of interest from the processor and displays the modeled appearance of the surface of interest.

25. The system of claim 24, wherein the surface measurement device comprises at least one device selected from the group consisting of a spectrophotometer, a colorimeter, a flatbed scanner, a laser surface scanner, a simple camera, a hyperspectral cameras, and an artificial retina.

26. The system of claim 24, further comprising an orientation sensor, and wherein the at least one environmental factor comprises at least one value derived from an output of an orientation sensor associated with the system.

27. The system of claim 24, further comprising an enclosure housing the processor and the display device.

28. The system of claim 27, wherein the enclosure further houses the surface measurement device.

29. The system of claim 24, wherein the environmental factor is an orientation of the display device.

30. The system of claim 24, wherein the environment factor is an ambient illumination factor of the display device.

31. The system of claim 24, wherein the environmental factor is a vantage point of a viewer relative to the display device.

* * * * *

UNITED STATES PATENT AND TRADEMARK OFFICE
CERTIFICATE OF CORRECTION

PATENT NO. : 9,767,599 B2  
APPLICATION NO. : 11/617880  
DATED : September 19, 2017  
INVENTOR(S) : Francis Lamy and Jon Kenneth Nisper Page 1 of 1

It is certified that error appears in the above-identified patent and that said Letters Patent is hereby corrected as shown below:

In the Specification

Column 4 Line 23 delete "(e.g., MLTNSELL" and insert -- (e.g., MUNSELL --

Column 5 Line 24 delete "r and C" and insert -- r and G --

Column 5 Line 42 delete "nay represent" and insert -- may represent --

Column 5 Line 48 delete " BRDF_ba □(=) (1/λ^2 ) Φ_ba (φ_2)R_a (θ_i)G(f) " and insert -- BRDF_ba □(=) (1/λ^2 ) Φ_ba (φ_s)R_a (θ_i)G(f) --

Column 6 Line 25 delete "diff-use" and insert -- diffuse --

Column 11 Line 55 delete "surface appearance card 100" and insert -- surface appearance card 1100 --

Column 13 Line 2 delete "calorimeter" and insert -- colorimeter --

Column 13 Lines 7-8 delete "calorimeter" and insert -- colorimeter --

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*